United States Patent [19]

Tanaka et al.

[11] Patent Number: 4,813,069

[45] Date of Patent: Mar. 14, 1989

[54] COMPUTER SYSTEM HAVING AUTOMATIC ANSWERING TELEPHONE FUNCTION

[75] Inventors: Nobuo Tanaka, Kashiwara; Satoshi Tominaga, Nara; Hisao Okada, Yamatokoriyama; Toshihiko Yoshida, Nara, all of Japan

[73] Assignee: Sharp Kabushiki Kaisha, Osaka, Japan

[21] Appl. No.: 929,787

[22] Filed: Nov. 13, 1986

[30] Foreign Application Priority Data

Nov. 14, 1985 [JP] Japan ................................ 60-257488

[51] Int. Cl.⁴ ........................ G06F 9/04; G06F 13/10; H04M 1/64

[52] U.S. Cl. ................................ 379/82; 364/705.04; 364/705.05; 379/73

[58] Field of Search .................... 364/705; 379/67, 79, 379/81, 82, 93, 96, 98, 73

[56] References Cited

U.S. PATENT DOCUMENTS 3,920,908 11/1975 Kraus .................................. 379/91
4,503,288 3/1985 Kessler ................................. 379/67
4,623,758 11/1986 Batla et al. ............................ 379/80
4,660,218 4/1987 Hashimoto .............................. 379/93
4,672,659 6/1987 Hanscom et al. ...................... 379/79
4,701,946 10/1987 Oliva et al. ........................... 379/98

*Primary Examiner*—Thomas W. Brown
*Attorney, Agent, or Firm*—Birch, Stewart, Kolasch and Birch

[57] ABSTRACT

A computer system is disclosed which has an automatic answering telephone function. The system comprises a main control unit, a telephone control unit, a voice information storage medium, a program unit for automatic telephone answering and processing, a program unit for performing data processing, and a mode setting circuit for setting the automatic telephone answering and the data processing to be performed. Either of the above program units may be started for operation by the mode setting circuit.

4 Claims, 3 Drawing Sheets

COMPUTER SYSTEM HAVING AUTOMATIC ANSWERING TELEPHONE FUNCTION

BACKGROUND OF THE INVENTION

The present invention relates to a novel computer system having an automatic answering telephone function. The system comprises a conventional data processing personal compouter as well as a telephone and a cassette recorder both attached to the personal computer.

An automatic answering telephone set with a special-purpose machine has heretofore been known, but because of a dedicated machine only the fixed functions of record and playback have been realized.

SUMMARY OF THE INVENTION

It is an object of the present invention to provide an automatic answering telephone set which has an automatic telephone answering function as one function of a general-purpose personal computer and the versatility of the computer conforms to any program prepared by the user.

Other objects and further scope of the applicability of the present invention will become apparent from the detailed description given hereinafter. It should be understood, however, that the detailed description and specific examples, while indicating preferred embodiments of the invention, are given by way of illustration only, because various changes and modifications within the spirit and scope of the invention will become apparent to those skilled in the art from this detailed description.

Briefly described, in accordance with the present invention, a compouter system is provided which has an automatic telephone answering function. The system comprises a main control unit, a telephone control unit, a voice information storage medium, a program unit for performing automatic telephone answering process, a program unit for performing data processing, and a mode setting function for setting the automatic telephone answering process and the data processing to be performed, either of the above program units is started for operation by the mode setting function.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

A construction of the present invention will be described hereinunder.

Figure 1:
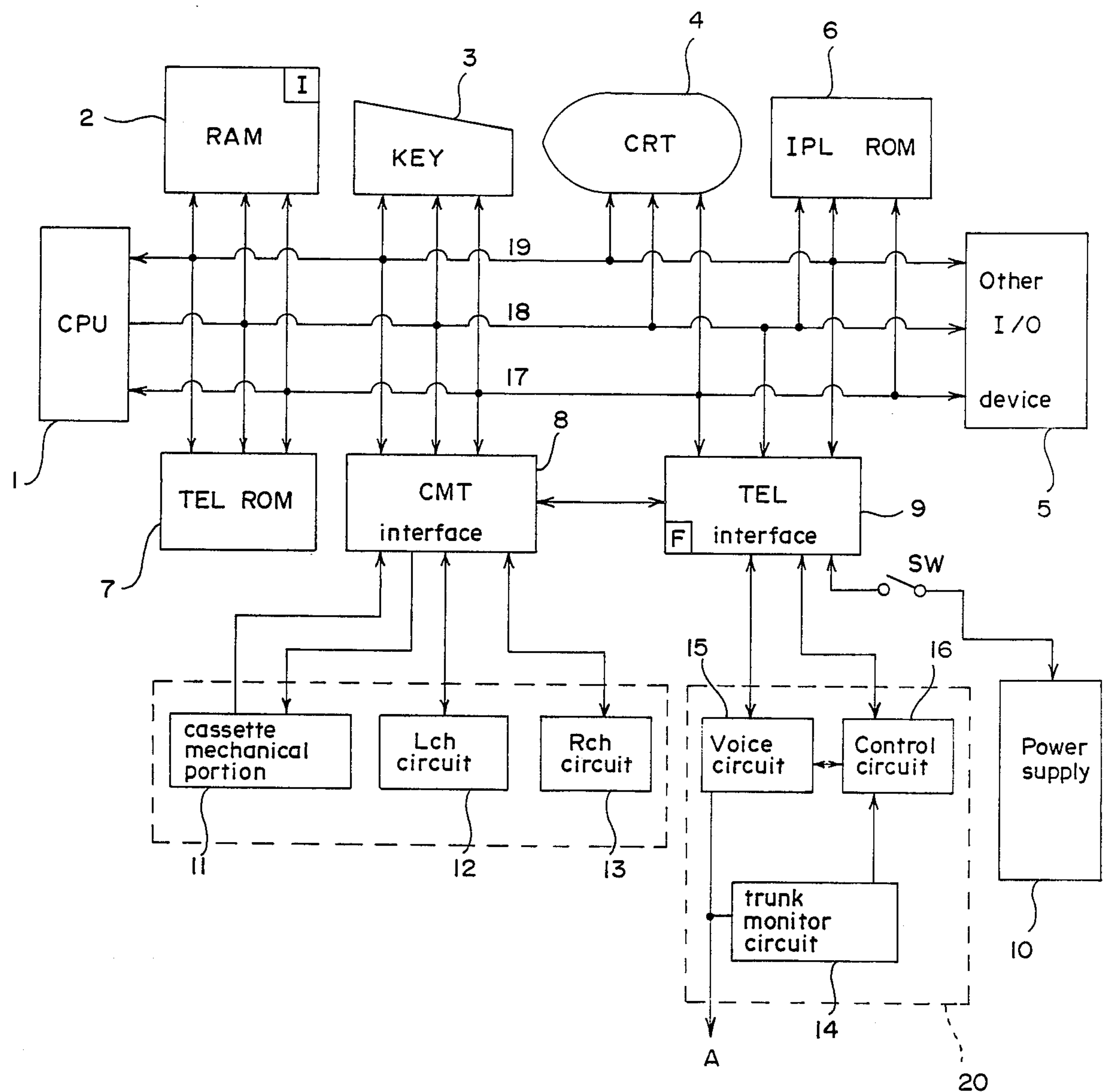
FIG. 1 is a block diagram of a computer system having an automatic telephone answering function according to an embodiment of the present invention.

FIG. 1 is a block diagram of a computer system according to an embodiment of the present invention, in which the reference numeral 1 denotes a central processing unit which executes various controls through processing in accordance with program instructions.

Numeral 2 denotes a RAM (random access memory) for storing program instructions and data; numeral 3 denotes a keyboard device (KEY); numeral 4 denotes a CRT display device which displays data, etc. in accordance with instructions provided from the CPU 1; and numeral 5 denotes an input/output (I/O) device other than those mentioned above, e.g. floppy disk.

Further, numeral 6 denotes a ROM (read only memory) for storing an IPL (Information Processing Language) program routine. The IPL program routine is a program for transferring a program, for example, of an OS (operating system) to the RAM 2 from the I/O device 5 such as floppy disk in order to establish a basic system of the computer.

Numeral 7 denotes a ROM which stores control programs for making this system funtion as an automatic telephone answering system. Numeral 7 will be referred to hereinafter as "TELROM".

Numeral 8 denotes an interface for the connection of a cassette unit and the CPU 1. The interface 8 controls a cassette mechanical portion 11 in accordance with instructions provided from the CPU 1. The cassette mechanical portion 11 represents a mechanical portion in the cassette unit. The cassette unit 8 will be referred to hereinafter as "CMT (cassette mechanical tape) interface".

The magnetic tape cassette has a Rch (right-hand channel) track and a Lch (left-hand channel) track. In the Rch track, analog voice data is stored, while in the Lch track, control codes for digital data are recorded corresponding to records of the Rch track. Numeral 12 denotes a recording/reproducing circuit for a recording head and a reproducing head in the Lch (left-hand channel). The Lch circuit 12 records and reproduces digital data to and from the left channel. The circuit indicated by the numeral 12 will be referred to hereinafter as the "Lch circuit". Numeral 13 denotes a recording/reproducing circuit for a recording head and a reproducing head in the Rch (right-hand channel). The Rch circuit 13 records and reproduces analog voice data to and from the right channel. The circuit indicated by the numeral 13 will be referred to hereinafter as the "Rch circuit". Through the CMT interface 8, the CPU 1 performs a signal transfer between the Lch circuit 12 and a data bus 17, as well as a signal transfer between the Rch circuit 13 and a voice circuit 15 through a later-described TEL interface 9, and a signal is output for a cassette state.

The TEL interface 9 provides a connection between a telephone unit 20 and the CPU 1. In accordance with instructions provided from the CPU 1, the CPU 1 controls a telephone unit control circuit 16, outputs a state of the telephone unit 20, or performs a signal transfer for the voice circuit 15 in the telephone unit 20, and controls a power supply.

Numeral 10 denotes a power supply unit having a main power supply circuit for supplying electric power to each unit and an auxiliary power supply circuit for supplying electric power to only limited units. The main power supply circuit is controlled in accordance with a signal from the TEL interface 9 based on a mode switch SW. When the level of the signal provided from the TEL interface 9 is High, the main power supply circuit turns OFF, so the entire system is not supplied with electric power and a stand-by state is assumed. On the other hand, the TEL interface 9 and the telephone unit 20 are supplied with electric power at all times from the auxiliary power supply circuit. When the level of the signal provided from the TEL interface 9 is Low, the main power supply circuit 10 turns ON, so the entire system is supplied with electric power and the CPU 1 is initialized to execute the IPL program.

When the mode switch SW is open (normal), the signal from the TEL interface 9 is not transferred to the power supply unit 10, so the control for the main power supply circuit based on the TEL interface is no longer performed. Consequently, electric power is supplied to the entire system when a power supply switch is turned ON.

Thus, when the mode switch SW is closed (Remode), electric power is not supplied to the entire system even upon the application of power, so the entire system assumes a stand-by state until the system responds to a telephone call, whereupon electric power is supplied to the system.

However, when the mode switch SW is open (normal), electric power will be supplied to the entire system when the power is turned ON.

Numeral 14 denotes a trunk monitor circuit that is provided within the telephone unit 20. The trunk monitor circuit 14 informs the TEL interface 9 of a telephone call state in the telephone unit 20. An end portion A is connected to a telephone line (not shown), which in turn is connected to the TEL interface 9 through the voice circuit 15. The control circuit 16 connects and disconnects the telephone circuit and the voice circuit 15 to and from each other in accordance with instructions provided from the TEL interface 9.

Numerals 17, 18 and 19 denote a data bus, an address bus, and a control bus, respectively.

Figure 2:
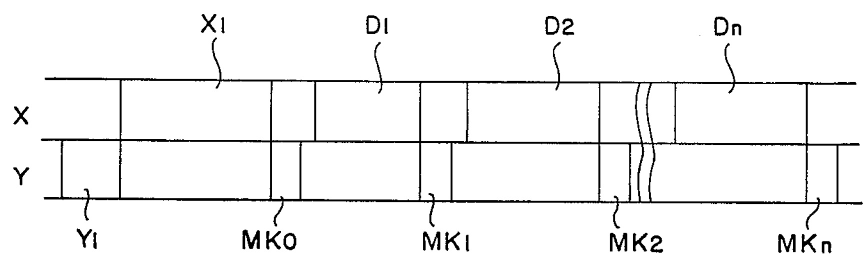
FIG. 2 is an explanatory view of data recorded on a magnetic tape which is used in the above system.

Data stored in the magnetic tape cassette used in this embodiment are stored in such a format as shown in FIG. 2, in which X and Y correspond to the Rch and Lch tracks, respectively, In a head Rch track $X_1$ of the magnetic tape a prestored voice message for a call originator is prestored. In a Lch track $Y_1$ corresponding to the recorded position of the prestored voice message, digital index, data namely, the number of voice messages from call originators are recorded after being updated at the reception of each call.

Following this prestored voice message, voice messages $D_1, D_2, \ldots D_n$ of the call originator are successively recorded at the reception of each call, while in the Lch track digital control data $Mk_0, Mk_1, \ldots Mk_n$ are recorded which indicate the start of a record in positions corresponding to the recorded positions of the message voices $D_1, D_2, \ldots D_n$. The control data $Mk_0, Mk_1, \ldots Mk_n$ are used as position data for searching the recorded positions of the call originator's voice messages.

The entire operation of this embodiment will be explained below.

When the mode switch SW is in a normal state (corresponding to a data processing mode of a conventional personal computer) and the power switch is turned ON, the entire system is supplied with electric power. For example, an All Clear signal is supplied to each circuit component for initialization, and also in the CPU 1, an initialization and access is performed to the IPLROM 6.

The system is established on the basis of the program in the IPLROM 6. At this time, if a flip flop F (this indicates whether the execution is of an automatic telephone answering process or of another process) in the TEL interface 9 is in a reset state, then the operation for loading the system program into the RAM 2 is started from the floppy disk which stores the system program.

In this case, therefore, it becomes possible to initiate any data processing stoedd in the floppy disk; in other words, the operation of the system as a general personal computer becomes feasible.

When the mode switch SW is in a Remode state, electric power is supplied to only the telephone unit 20 and the TEL interface 9 (stand-by state). If a telephone call is from the call originator in the stand-by state, the flip flop F in the TEL interface 9 is set and at the same time electric power is fed to all of the circuit compo-nents, whereby the above initialization process is performed. According to the state of the flip flop F, the above processing in the IPLROM 6 causes the TEL-ROM 7 to be accessed, which results in an automatic telephone answering process to be executed.

The operation of this embodiment will be described indetail below.

Figure 3:
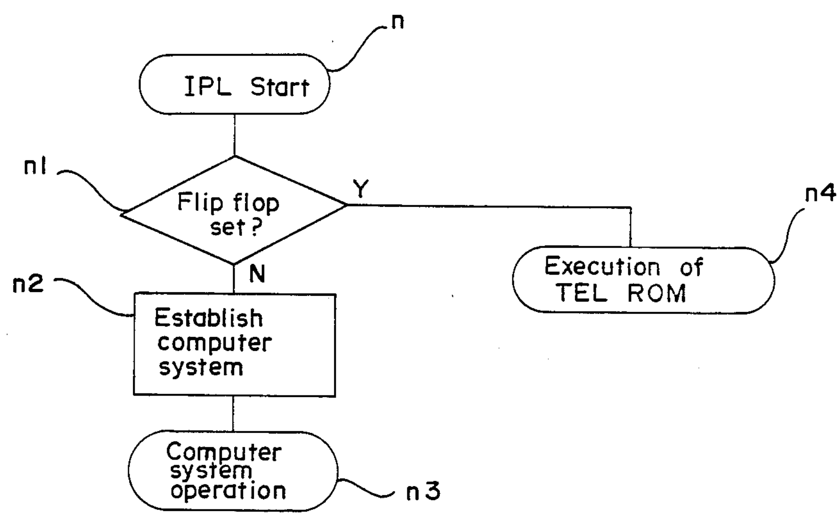
FIG. 3 is a flowchart for the selection of data processing and the automatic telephone answering and processing in the above system.

FIG. 3 is a flowchart of the IPL processing. The IPL program starts ($n_0$ step) and advances to step $n_1$. In step $n_1$, a check is made as to whether the flip flop F in the TEL interface 9 is set or not ($n_1$ step). If the flip flop F is set, then the program shifts to step $n_4$, so that the TELROM 7, which stores a control program for producing an automatic telephone answering function, is changed over onto a memory map, and a jump is made to the head address, followed by processing in accordance with program instructions stored in the TEL-ROM 7 (the details thereof are as shown in FIG. 4).

However, if the flip flop F of the TEL interface 9 is not set, the program advances to step $n_2$. In step $n_2$, the system is established as a microcomputer, and a system program such as OS or BASIC is transferred to the RAM 2 from a floppy disc for example. Next, a jump is made to the head address of the system program followed by the starting of the execution and operation of the data processor as a general personal computer ($n_3$ step). In this case, therefore, the TELROM 7 is in a separated state from the system.

Figure 4:
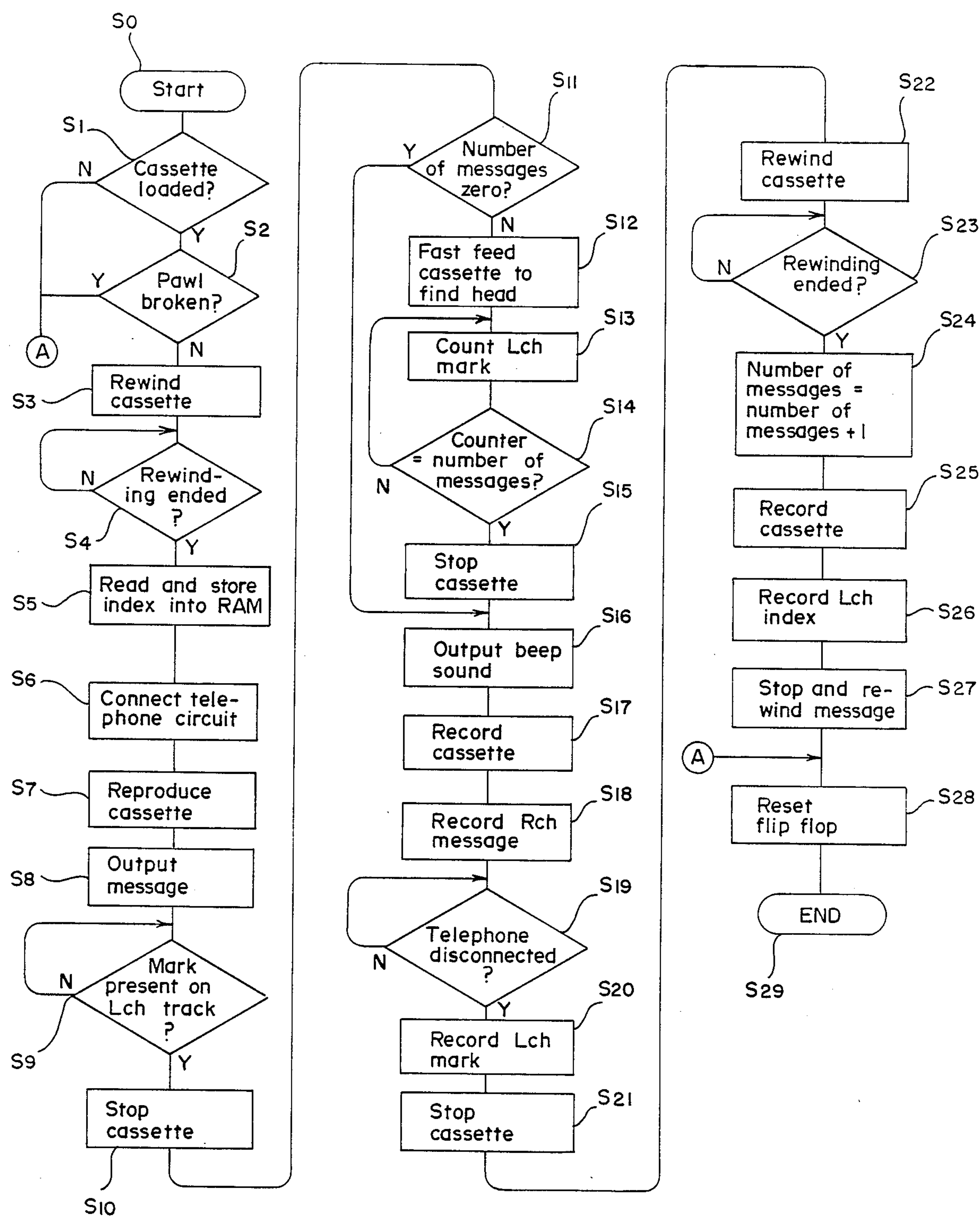
FIG. 4 is a flowchart of the automatic telephone answering and processing.

FIG. 4 shows the processing of the TELROM 7. When there is a telephone call from a call originator, the trunk monitor circuit 14 detects an incoming call, and an incoming signal is fed to the TEL interface 9, which in turn sets the internal flip flop F in accordance with the incoming signal. Further, a control signal is provided to the power supply unit 10 to operate the main power supply circuit, and electric power is supplied to the entire system from these components so that the CPU 1 is initialized to execute the IPL program. In the execution of the IPL program, since the flip flop F in the TEL interface 9 is set, the TELROM 7 is accessed and the CPU 1 shifts so that the program stored in the TELROM 7 is executed. That is; the execution of the processing shown in FIG. 4 is started (step $S_0$).

First, the cassette interface is accessed and the state of a cassette is checked (steps $S_1$ and $S_2$). In the event that a cassette is not set, or a recording prevention pawl is broken, the program branches to A and the flip flop F in the TEL interface 9 is reset (step $S_{28}$). In this case, a telephone call is not answered and the system processing is not executed.

On the other hand, if the state of a cassette is normal, a rewind instruction is provided to the cassette unit to initiate the rewinding of the cassette (step $S_3$).

Upon rewinding up to the tape head (step $S_4$), a playback instruction is provided to the cassette and index data is read from the Lch track and stored in a buffer I of the RAM 2 (step $S_5$).

Next, the cassette is stopped and a line connection command is provided to the control circuit 16 in the telephone unit and the telephone line is connected to receive a telephone call (step $S_6$).

Then, a playback instruction is provided to the cassette unit. In accordance with this playback instruction, the head message in FIG. 2 is reproduced from the Rch circuit (step $S_7$), supplied to the voice circuit 15 through the CMT interface 8 and the TEL interface 9, output to the telephone line and transmitted to the call originator (step $S_8$).

Upon hearing the above message, the call originator will become aware that the other party is absent.

When mark $Mk_0$, which represents the end of the above message, is detected from the Lch circuit (step $S_9$), a STOP instruction is provided to the cassette unit which stops the cassette (step $S_{10}$).

A judgment is made as to whether the message number $N_1$, of the index data stored in the RAM 2 is zero or not (step $S_{11}$). If N does not equal 0, then the cassette is fast forwarded for playback (step $S_{12}$).

At this time, mark data $Mk_i$ from the Lch circuit 12 is detected and the counter reading incorporated in the RAM 2 is counted (step $S_{13}$). A comparison is made between this counter and the buffer I (step $S_{14}$), and upon the two coinciding, that is, the arrival at the record position of the voice message the travelling of the cassette is stopped (step $S_{15}$).

On the other hand, in the case of N being equal to 0, the above processing is not performed because the record position has already been reached.

In this state, the preparation for recording the voice message is completed and a beep sound generating command is provided to the control circuit 16 in the telephone unit, so that a beep sound of a predetermined frequency is output to the telephone line through the voice circuit 15 (step $S_{16}$). Following the beep sound, the call originator sends his message (step $S_{17}$). This voice message information is supplied to the Rch circuit 13 through the voice circuit 15, the TEL interface 9 and the CMT interface 8 (step $S_{18}$).

Upon termination of the message, the call originator disconnects the telephone line (step $S_{19}$). The trunk monitor circuit 14 detects the line disconnection and causes an interrupt from the control circuit 16 to the CPU 1 through the TEL interface 9.

Then, the cassette is brought into a recording state and the $Mk_i$ mark data is supplied to the Lch circuit 12 through the CMT interface 8, whereby the $Mk_i$ mark data is recorded in the Lch track in a position corresponding to the recorded position of the message (step $S_{20}$).

Thereafter, a cassette stop command is provided which stops the travel of the cassette (step $S_{21}$).

Further, a cassette rewind command is provided (step $S_{22}$) whereby the cassette is rewound up to the head position, namely, the index record position (step $S_{23}$).

In this case, the buffer I in the RAM 2 is counted (step $S_{24}$) and the result is recorded as an updated index data (step $S_{25}$). Upon completion of the recording (step $S_{26}$), the travel of the cassette is stopped and the cassette is further rewound (step $S_{27}$).

Next, the flip flop F in the TEL interface 9 is reset (step $S_{28}$), whereby the main power supply circuit is turned OFF and the system assumes the normal standby state (step $S_{29}$).

In this embodiment a two-track magnetic tape is used as the recording medium. Voice data can be recorded in one track and digital data which conforms to a user program can be recorded in the other track. Therefore, an automatic telephone answering process based on the digital data is made possible.

As set forth hereinabove, the computer system of the present invention is provided with a main control unit, a telephone control unit, a voice information storage medium, a program unit for performing automatic answering telephone processing, a program unit for performing data processing, and a mode setting function for setting the automatic telephone answering process and the data processing to be performed. Either of the above program units may be started for operation by the mode setting function. Since a recording medium of a computer is used as the recording medium, the recording medium is operated optionally according to user programs. Thus, it is possible to realize processing which conforms to conventional data processing, and thereby, the system may become more extensive.

While only certain embodiments of the present invention have been described, it will be apparent to those skilled in the art that various changes and modifications may be made therein without departing from the spirit and scope of the present invention as claimed.

What is claimed is:

1. A computer system for processing data and automatically answering telephone calls arriving on a connected telephone line, comprising:

central processing means for controlling operation of the computer system;

first program means for storing automatic answering and recording programs that are executed in response to a first request by said central processing means;

second program means for storing an operating system program that initializes the computer system for data processing in response to a second request by said central processing means;

telephone call monitoring means for detecting the receipt of telephone calls from the connected telephone line;

cassette recording means for receiving said telephone calls and having a first channel and a second channel for recording and reproducing data from telephone calls, said first channel recording and reproducing analog data and said second channel recording and reproducing digital data;

main power supply means for supplying power to all of the computer system;

auxiliary power supply means for supplying power only to said telephone control means; and mode setting means for connecting said main power supply means to said computer system when a first mode is selected and for connecting said auxiliary power supply means to said telephone call monitoring means when a second mode is selected, said mode setting means automatically selecting said first mode when said telephone call monitoring means detects a telephone call thereby supplying power to said computer system including said cassette recording means to record data from said telephone call.

2. The computer system as set forth in claim 1, wherein said telephone call monitoring means includes telephone interface means and said cassette recording means includes cassette interface means, said telephone interface means and said cassette recording means being connected so that data may be transmitted between said telephone call monitoring means and said cassette recording means.

3. The computer system as set forth in claim 1, wherein said mode setting means comprises flip flop means for developing a set state that initializes the computer system by said second program means when said first mode is set and for developing a reset state that permits activation of said telephone call monitoring means by said first program means in response to telephone calls when said second mode is set.

4. The computer system as set forth in claim 3, wherein said telephone call monitoring means further comprises:

trunk monitor means for developing a call signal that initializes said set state in response to a telephone call;

voice producing means for outputting a pre-recorded voice signal from said first channel of said cassette recording means to said connected telephone line; and control means for connecting and disconnecting said voice producing means with said connected telephone line in response to said central processing means.

* * * * *